(12) United States Patent
Barmpoutis (10) Patent No.: US 10,121,273 B2
(45) Date of Patent: Nov. 6, 2018

(54) REAL-TIME RECONSTRUCTION OF THE HUMAN BODY AND AUTOMATED AVATAR SYNTHESIS

(71) Applicant: University of Florida Research Foundation, Incorporated, Gainesville, FL (US)

(72) Inventor: Angelos Barmpoutis, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 367 days.

(21) Appl. No.: 14/904,891

(22) PCT Filed: Aug. 8, 2014

(86) PCT No.: PCT/US2014/050341
§ 371 (c)(1),
(2) Date: Jan. 13, 2016

(87) PCT Pub. No.: WO2015/021381
PCT Pub. Date: Feb. 12, 2015

(65) Prior Publication Data
US 2016/0163083 A1   Jun. 9, 2016

Related U.S. Application Data

(60) Provisional application No. 61/863,486, filed on Aug. 8, 2013.

(51) Int. Cl.
*G06T 13/40* (2011.01)
*G06T 17/20* (2006.01)
(Continued)

(52) U.S. Cl.
CPC ............ *G06T 13/40* (2013.01); *G06K 9/4642* (2013.01); *G06T 7/149* (2017.01); *G06T 7/521* (2017.01);
(Continued)

(58) Field of Classification Search
CPC .................. G06T 13/40; G06T 7/50
See application file for complete search history.

(56) References Cited

U.S. PATENT DOCUMENTS 6,757,423 B1 * 6/2004 Amini .................... G06T 7/246
382/128
8,922,553 B1 * 12/2014 Tena ....................... G06T 17/00
345/419

(Continued)

FOREIGN PATENT DOCUMENTS

JP  2008-541599  11/2008

OTHER PUBLICATIONS

From Point Clouds to Tensor Product B-Spline Surfaces, Lavanya Sita Tekumalla, A Masters Thesis submitted to the faculty of the University of Utah, Dec. 2004.*

(Continued)

*Primary Examiner* — Jitesh Patel
(74) *Attorney, Agent, or Firm* — Alston & Bird LLP (57) ABSTRACT

Systems and Techniques for real-time 3D reconstruction of the human body are described. Avatars (the rendered 3D reconstruction of the human body) can be generated from real-time captured RGB-D images of a person. Avatars can be synthesized from the RGB-D data received from a single RGB-D camera by performing body segmentation (into cylindrical-type objects) and dynamic robust data filtering on sequential frames of the captured data. Cylindrical-type objects of the body, including arms, legs, and torso are parameterized using tensor splines; and positive-definite (Continued)

constrains are imposed to the estimated tensor splines using a Riemannian metric defined on the space of positive-definite tensor splines. These generated avatars have an articulated body with separately translatable and rotatable arms, legs, and other limbs or cylindrical features.

7 Claims, 7 Drawing Sheets

(51) Int. Cl.
    *G06K 9/46*     (2006.01)
    *G06T 7/521*     (2017.01)
    *G06T 7/149*     (2017.01)

(52) U.S. Cl.
    CPC .... *G06T 17/20* (2013.01); *G06T 2207/10016* (2013.01); *G06T 2207/10021* (2013.01); *G06T 2207/10024* (2013.01); *G06T 2207/10028* (2013.01); *G06T 2207/30196* (2013.01)

(56) References Cited

U.S. PATENT DOCUMENTS

| | | | | |
|---|---|---|---|---|
| 8,970,590 | B1* | 3/2015 | Brennan | G06T 17/10 345/423 |
| 2003/0034971 | A1* | 2/2003 | Fujiwara | G06T 17/30 345/420 |
| 2006/0182314 | A1* | 8/2006 | England | G01C 15/002 382/106 |
| 2008/0018647 | A1* | 1/2008 | Bunnell | G06T 13/00 345/426 |
| 2008/0309664 | A1* | 12/2008 | Zhou | G06T 13/40 345/420 |
| 2009/0284627 | A1* | 11/2009 | Bando | G06K 9/00201 348/273 |
| 2010/0020073 | A1* | 1/2010 | Corazza | G06T 13/40 345/420 |
| 2010/0030532 | A1* | 2/2010 | Arora | G06F 17/5009 703/2 |
| 2011/0267356 | A1* | 11/2011 | Rennuit | G06T 13/40 345/473 |
| 2012/0013617 | A1* | 1/2012 | Zhang | G06T 17/00 345/420 |
| 2012/0163723 | A1 | 6/2012 | Balan et al. | |
| 2013/0106852 | A1* | 5/2013 | Woodhouse | G06T 17/20 345/423 |
| 2013/0271565 | A1* | 10/2013 | Chen | H04N 13/0048 348/43 |
| 2013/0286012 | A1* | 10/2013 | Medioni | G06T 17/00 345/420 |
| 2013/0342527 | A1* | 12/2013 | Molyneaux | G06T 7/0032 345/419 |
| 2014/0035901 | A1* | 2/2014 | Chen | G06T 13/40 345/419 |
| 2014/0092439 | A1* | 4/2014 | Krig | G06K 9/001 358/2.1 |

OTHER PUBLICATIONS

A Semantic Segmentation Algorithm of 3D Model, Bai et al, Networked Computing and Advanced Information Management (NCM), 2011 7th International Conference.*

An algorithm for fitting data over a circle using tensor product splines, P. Dierckx, Dept. of Comp Sci, Feb. 1985.*

Tensor Splines for Interpolation and Approximation of DT-MRI With Applications to Segmentation of Isolated Rat Hippocampi, A Barmpoutis, IEEE Transcations on Medical Imaging, vol. 26, No. 11, Nov. 2007.*

Leandro Cruz et al., "Kinect and RGBD Images: Challenges and Applications", 25th SIBGRAPI Conference on Graphics, Patterns, and Images Tutorials, Aug. 22-25, 2012, pp. 36-49.

John R. Herring, "Using Spline Functions to Represent Distributed Attributes", Proceedings of the International Symposium on Computer-Assisted Cartography, Mar. 25-28, 1991, pp. 46-58.

Angelos Barmpoutis, "Automated Human Avatar Synthesis for Obesity Control using Low-Cost Depth Cameras", 20th MMVR Conference: Medicine Meets Virtual Reality, Feb. 20-23, 2013, 8 sheets.

International Search Report/Written Opinion, International Application No. PCT/US2014/050341, PCT/ISA/210, PCT/ISA/237, dated Nov. 17, 2014.

* cited by examiner

REAL-TIME RECONSTRUCTION OF THE HUMAN BODY AND AUTOMATED AVATAR SYNTHESIS

CROSS-REFERENCE TO RELATED APPLICATIONS

This application is a national stage application of International Patent Application No. PCT/US2014/050341, filed Aug. 8, 2014, which claims the benefit of U.S. Provisional Patent Application No. 61/863,486, filed Aug. 8, 2013, the disclosures of each of which are incorporated herein by reference in their entirety, including any figures, tables, and drawings.

BACKGROUND

The combination of infrared (IR) depth cameras and red-green-blue (RGB) video can be referred to as RGB-D, which provides color and depth data. RGB-D cameras are a type of range camera that have been widely used as low-cost peripheral devices for various applications related to virtual reality interaction using natural user interfaces, for example MICROSOFT KINECT®. The information captured by these devices can be used to extract useful information related to the tridimensional shape of a person's body, as well as track changes on its size, range of motion and physical condition. RGB-D cameras (and sensors) can be used as part of a natural user interface for controlling (without touch) a cursor or other tool on a screen for interacting with images, documents, games, and other applications or software.

Human avatars can be reconstructed in 3D using image-based or video-based approaches. These methods perform various intermediate steps such as image processing to label object pixels, calculating the volume intersection, and rendering the visual hull. However techniques that require prior environmental setup (such as specific arrangement of multiple cameras in the 3D space) do not lend themselves to arbitrary arrangements. Furthermore, such avatars are often reconstructed as non-articulated rigid objects, and as a consequence cannot be re-rendered in new arbitrary postures.

BRIEF SUMMARY

This disclosure describes a method for reconstructing in real time the human body as an articulated generative 3D model that can be re-rendered in arbitrary postures. The described method fits a parametric model—a positive-definite tensor spline model—to the data captured from a single range camera in real-time. The range camera can be a RGB-D camera. The depth (D) data is used for generating a 3D model and the RGB color can be used to make the avatar life-like. Advantageously, a human subject can be reconstructed in 3D while they naturally move and interact with the system, without requiring the subject to stand in a particular posture.

Avatars can be synthesized from RGB-D data by performing body segmentation and dynamic robust data filtering. Cylindrical-type objects (of the body) are parameterized using tensor splines and positive-definite constrains are imposed to the estimated tensor splines using a Riemannian metric defined on the space of positive-definite tensor splines. The Riemannian metric can also be employed for interpolation/extrapolation between avatars.

In certain implementations, a system is provided that includes a reconstruction processor that receives data from a RGB-D camera/sensor and performs segmentation, data filtering, and tensor-spline fitting. The data may be received from an intermediate processor or stage that performs skeleton fitting and/or mapping of the RGB and D to each other; or such processes may be performed by the reconstruction processor. The output of the reconstruction processor can be rendered for display or otherwise used by the system to re-render the body in arbitrary positions. In some implementations, the display may be part of a computing system at a separate location from that of the reconstruction processor. In further implementations, the RGB-D camera/sensor may be included as part of the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and Techniques for real-time 3D reconstruction of the human body are described. Avatars (the rendered 3D reconstruction of the human body) can be generated from real-time captured RGB-D images of a person. These generated avatars have an articulated body with separately translatable and rotatable arms, legs, and other limbs or cylindrical features.

Avatars can be synthesized from the RGB-D data by performing body segmentation and dynamic robust data filtering. Cylindrical-type objects of the body, including arms, legs, and torso are parameterized using tensor splines; and positive-definite constrains are imposed to the estimated tensor splines using a Riemannian metric defined on the space of positive-definite tensor splines. The Riemannian metric can also be employed for interpolation/extrapolation between avatars.

Figure 1:
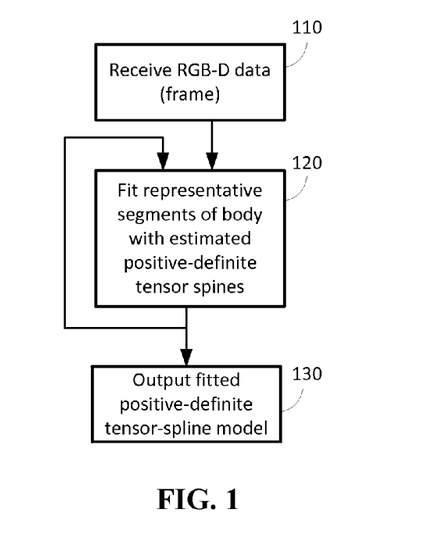
FIG. 1 shows a process flow diagram of a method for reconstructing the human body as an articulated generative 3D model.

FIG. 1 shows a process flow diagram of a method for reconstructing the human body as an articulated generative 3D model. The method illustrated in FIG. 1 may be performed by a reconstruction processor or a general purpose computer executing instructions to carry out the method. Referring to FIG. 1, images from a RGB-D camera/sensor can be captured, and the data received (110). The RGB-D data from the captured images can then be used to estimate positive-definite tensor spines that are fit to representative segments of a human body (120). For example, as each new RGB-D frame is received, the new frame is combined with the previous result of the fitting step (120) to improve the estimation and fit (e.g., the fitting can be recursive). The estimation can be performed using a mathematical model for parameterizing the space of positive-definite tensors. This mathematical model may involve a convex approximation of the space to ensure that the estimated tensors lie within the positive-definite side of the space.

For example, the model can employ Cartesian tensor basis and b-spline basis to define a tensor spline, which is a smoothly varying 1-dimensional field of closed 2D-curves. The tensor spline includes intrinsic positive-definite constraints in order to approximate cylindrical-type 3D objects with positive volume, and can be referred to as a positive-definite tensor slice model. This positive-definite tensor spline model can be employed to approximate the arms, forearms, thighs, legs and torso in the human body using an energy-driven data fitting process. Other cylindrical features of a subject may be modeled by including additional segments in the positive-definite tensor spline model.

The fitted positive-definite tensor-spline model can be output (130) and used for reconstructing and rendering an avatar. A similar process can be carried out even when the range camera does not include a color component as the depth component generates the tensor-spline model and the color component provides a wrapper that gives the avatar a skin.

A Riemannian metric on the space of the positive-definite tensor-splines can be employed for interpolation, extrapolation, and, in general, for computing geodesics between 3D reconstructed avatars.

The described method for real-time reconstruction of the human body runs in real-time (i.e., as the images are being captured) and does not require the human subjects to be captured in a specific posture. The lack of restrictions on the postures enables a 3D reconstruction to be depicted in the RGB-D frames on a variety of postures. The 3D reconstruction can be performed while the user interacts with a natural user interface environment. For example, the methods described herein can be performed while a user plays a game, enabling a user's avatar to reflect the motion and actions of the user.

Implementations of the described techniques can be incorporated in systems and applications in the areas of entertainment, education, communications, psychology, telemedicine, and others. The 3D reconstruction can be used to monitor the changes in the shape of human bodies and perform quantitative analysis of body shapes in a specific age/gender group (or across population groups or other classifications). The resulting data may be useful for statistical studies in general and even studies and diagnostics related to obesity or other related diseases such as heart disease as an example. The described techniques may also be used in a module for frequency-based shape compression of human bodies depicted in holographic videos.

Most parts of the human body can be modeled as a set of positive-definite tensor splines that approximate the shape of the arms, forearms, legs, thighs, and torso. These segments of the human body can be approximated by rigid tridimensional models, since there are no significant deformations in their structure during a natural human motion, unlike the head and hands. The coefficient vector w of each tensor spline can be estimated from real data captured by RGB-D cameras. Real-time human avatar synthesis can be performed by fitting positive-definite tensor-spline models to point-sets collected from a sequence of RGB-D frames.

As described herein, input from an RGB-D camera can be converted into colored quadratic meshes. From the "D" data, a skeleton S can be estimated. Then, using both the colored quadratic meshes and the skeleton S, the parameters of any 3D model may be estimated if the model has an inverse model mapping function that uses the information in S to map the points of the quadratic mesh into the parameters of the 3D model.

Figure 2:
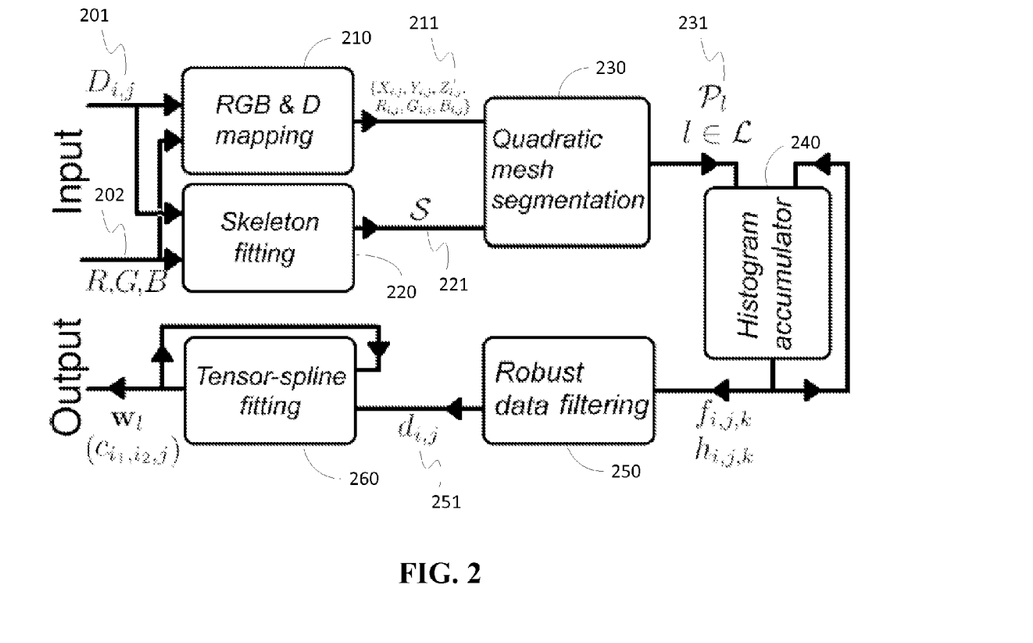
FIG. 2 shows a flow chart for avatar reconstruction from RGB-D frames.

FIG. 2 illustrates a method of reconstructing an avatar from RGB-D data according to an embodiment. Referring to FIG. 2, distance data $D_{is}$ (201) and RGB data (202) can be received from a camera (directly or indirectly).

The camera may include a depth camera that generates sequences of discrete depth frames 201 in the form of 2D arrays $D_{i,j}$, which can be equivalently expressed as quadratic meshes given by $X_{i,j}=(i-i_c)D_{i,j}c_d^{-1}$, $Y_{i,j}=(j-j_c)D_{i,j}c_d^{-1}$, and $Z_{i,j}=D_{i,j}$, where $i_c$, $j_c$ denote the coordinates of the central pixel in the depth frame, and $c_d$ is the focal length of the depth camera. These quadratic meshes provide a 3D model.

The camera may also include an RGB camera that captures video frames 202. The video frames 202 captured by the RGB camera can be associated with the quadratic meshes by using a UV texture mapping given by the coordinates $U_{i,j}=X_{i,j}'Z_{i,j}'^{-1}c_v$, $V_{i,j}=Y_{i,j}'Z_{i,j}'^{-1}c_v$, where the coordinates of the vector $[X'\ Y'\ Z']^T$ are related to $[X\ Y\ Z]^T$ via a known rigid transformation (rotation and translation), and $c_v$ is the focal length of the video camera.

The transformation relating the coordinates of the vectors corresponds to the mapping between the locations of the focal points and orientations of the two cameras (RGB and D). These calculations (quadratic mesh and UV texture mapping) may be performed in a RGB-D mapping module (or processor) 210.

Each frame of the RGB-D sequence can be considered a set of arrays $\{X_{i,j}, Y_{i,j}, Z_{i,j}, R_{i,j}, G_{i,j}, B_{i,j}\}$ (211), where R,G,B correspond to the red, green, and blue color channels of the video frame at the image coordinates $U_{i,j}, V_{i,j}$. This sequence of data frames can be used to detect the presence of a particular skeletal geometry (such as human skeletal geometry). Each frame can be fit to a skeletal model (from skeleton fitting module 220) that may be defined from the following set of parameters:

$$S=\{a_l \in \mathbb{R}^3, b_l \in \mathbb{R}^3, R_l \in SO(3): l \in \mathcal{L}\}$$

where $\mathcal{L}$ is a set of indices of line segments defined by the end-points $a_l$ and $b_l$, and its orientation in the 3D space is given by the rotation matrix $R_l$.

There are several algorithms that may be used to compute S (221) from RGB-D or just D, such as those implemented in the Microsoft Kinect SDK (M. A. Livingston et al., "Performance measurements for the Microsoft Kinect Skeleton," *IEEE Virtual Reality Work-shops*, pp. 119-120, 2012), in OpenNI library (see A. Davison, *Kinect Open Source Programming Secrets: Hacking the Kinect with OpenNI, NITE, and Java*. McGraw-Hill, 2012), and L. Xia et al., "Human detection using depth information by Kinect," *IEEE Conference on Computer Vision and Pattern Recognition Workshops*, pp. 15-22, 2011. The skeleton fitting module 210 can include any suitable algorithm for computing S.

A parametric 3D body model can be reconstructed from a sequence of colored quadratic meshes given an inverse model mapping function that maps every vertex $p=[X_{i,j}\ Y_{i,j}\ D_{i,j}]^T$ in the quadratic mesh to the parameters of the corresponding 3D body model. An example of such a 3D body model is the tensor spline model $$f_d(X, s) = \sum_{i=1}^{m} \sum_{j=0}^{n} w_{i,j} N_{j,k+1}(s) f_{d,i}^*(X),$$

which has a corresponding inverse model mapping function that maps every vertex $$p = [\ X_{i,j}\ Y_{i,j}\ D_{i,j}\ ]^T$$

in the quadratic mesh to the parameters (x, s) of the tensor spline body model given a skeleton S.

More specifically, once the data are converted to a colored quadratic mesh $\{X, Y, Z, R, G, B\}_{i,j}$ by the mapping module 210, the mesh can then be segmented into several body regions (via the quadratic mesh module 230) using the parameters of the skeletal model S computed from the skeleton fitting module 220.

For the RGB-D segmentation (performed in the quadratic mesh segmentation module 230), the parameters in the skeletal model S (221) can be used in order to segment the quadratic mesh that corresponds to a frame of the RGB-D sequence into different body regions. In particular, for every vertex $p=[X_{i,j}\ Y_{i,j}\ D_{i,j}]^T$ in the quadratic mesh, the index l of the closest line segment in the skeletal model is computed using equation E-1 as follows:

$$l(p) = \operatorname{argmin}_{l \in \mathcal{L}} \|a_l + s_l(p)(b_l - a_l) - p\|$$

where $a_l, b_l \in \mathbb{R}^3$ are vertices/joints that define a particular line segment in the skeletal model, and $s_l(p)$ is the projection of p onto the $l^{th}$ line segment given by equation E-2:

$$s_l(p) = \max\left\{\min\left\{\frac{(b_l - a_l)^T(p - a_l)}{\|b_l - a_l\|^2}, 1\right\}, 0\right\}$$

The max and min functions in equation E-2 provide that if the projection falls outside the line segment, the distance given as the argument of argmin in equation E-1 will be equal to the Euclidean distance between p and the closest end-point of the line segment (i.e $\min\{\|a_l-p\|, \|b_l-p\|\}$). Using equation E-1, every vertex p in the quadratic mesh is assigned to the closest body segment. This process segments the quadratic mesh into several body regions and is performed for every frame of the RGB-D sequence. The points that do not belong to the depicted human subject can be thresholded across $Z_{i,j}$, since the background objects usually have larger $D_{i,j}$ values.

Moving to the histogram accumulator module 240, the points that belong to a particular body region (as determined in the quadratic mesh segmentation module 230) form the point-set $P_l = \{p \in \mathbb{R}^3 : l(p)=l,\ 0 < s_{l(p)}(p) < 1\}$. The point-set $P_l$ (231) is used as the data source for the spline model $$f_d(X, s) = \sum_{i=1}^{m} \sum_{j=0}^{n} w_{i,j} N_{j,k+1}(s) f_{d,i}^*(x).$$

This model provides the positive-definite tensor spline fitting algorithm described in more detail in the examples section below.

In order to fit a positive-definite tensor spline of the above spline model to a pointset $P_l$ that consists of points on the surface of the $l^{th}$ body region, each point in $P_l$ is mapped to the domain of the function in the spline model. According to certain implementations, the domain is $S_1 \times \mathbb{R}$ and corresponds to the relative orientation and location of each point with respect to the central axis of the tensor spline.

Every point $p \in P_l$ can be uniquely mapped to $\mathbb{R}^2$ (i.e., the 2D plane of the unit circle $S_l$) by $$x_p = \begin{bmatrix} 1 & 0 & 0 \\ 0 & 0 & 1 \end{bmatrix} R_l^{-1}\left(p - \frac{a_l + b_l}{2}\right)$$

where $a_l$, $b_l$, and $R_l$ are the parameters of the $l^{th}$ segment of the skeleton (221), and the role of the matrix on the left is to project the result to a 2D plane that is perpendicular to the central axis of the tensor spline. Without loss of generality, the central axis is assumed here to be parallel to the y-axis of the Cartesian space, hence the first (x) and the third (z) components of the rotated vector are used as the elements of $x_p$.

The positive-definite tensor spline model can be fitted to the magnitude $\|x_p\|$ by minimizing the following energy function with respect to the coefficient vector $w_l$:

$$E(w_l) = \sum_{x} (f_l(x_p / \|x_p\|, s_{l(p)}(p)) - \|x_p\|)^2.$$

The data value $\|x_p\|$ in the above equation correspond to the unit vector $x_p/\|x_p\|$ in the angular domain of the tensor spline model and the point $s_{l(p)}(p)$ along the longitudinal dimension. The unknown vector $w_l$ can be estimated by any gradient-based optimization method (for example as described in C. Lawson and R. Hanson, *Solving Least Squares Problems*. Prentice-Hall, 1974) using the analytically computed gradients of the above equation. Additionally, positive-definite constraints can be applied to the elements of $w_l$ by updating their values using gradients computed in the Riemannian space.

Finally, the fitting process can be extended to accommodate multiple point-sets $P_l$ that that correspond to several RGB-D frames.

The least-squares fitting process described above performs averaging over the data values $\|x_p\|$ that correspond to the same angular and longitudinal coordinates (x, s) of the tensor spline domain in the tensor spline model. If the corresponding data values vary across multiple frames due to misfit of the skeletal model (221), then the result of the least-square fit is equivalent to the result obtained by fitting the tensor spline model to the mean of the corresponding data values. The average value, or L2-norm statistical quantities in general, are significantly affected by the presence of outliers in the data, causing erroneous tensor spline estimates.

This problem can be addressed in certain implementations by introducing a robust energy function based on the distribution of the data values, computed in the form of a histogram (and performed in the histogram module 240) as follows:

$$h(f, x, s; \mathcal{P}) = \sum_{p \in \mathcal{P}} N(f : \|x_p\|, \sigma_f^2) N(s; s_{l(p)}(p), \sigma_s^2) V\left(x; \frac{x_p}{\|x_p\|}, \kappa\right)$$

where $f \in \mathbb{R}$, $x \in S_1$, $s \in \mathbb{R}$, and the functions N ( ) and V ( ) denote the Normal and von Mises probability density functions respectively. The parameters $\sigma_f^2$, $\sigma_s^2$, and $\kappa$ are the variances and concentration of the probability functions.

For a given pair (x, s) the histogram h(f, x, s; P) shows the distribution of the data values $\|x_p\|$ in the space of real numbers, parameterized here by $f$. The peak of the histogram corresponds to the most dominant data value for a given (x, s), and it is robust to outliers.

For real-time (~25 frames/second) 3D body reconstruction, the histogram h(f, x, s; P) can be implemented by discretizing the domains of $f$, x, and s. The unit circle can be divided into M sections represented by $x_i = [\cos(2\pi i/M) \sin(2\pi i/M)]$, i=1 . . . M and the longitudinal axis can be similarly divided into N line segments represented by $s_j = (j-1)/(N-1)$, j=1 . . . N. For every new data pair $(x_p/\|x_p\|, s_{l(p)}(p))$ the closest bin $(x_i, s_j)$ in the discretized histogram will be used.

The domain of $f$ can be dynamically discretized in the form of an on-line K-means clustering algorithm without memory. For each of the K clusters the mean value of the cluster $f_k$ is stored as well as the number of data points assigned to this cluster $h_k$, k=1 . . . K. For every new data value $\|x_p\|$ in the bin $(x_i, s_j)$, the closest cluster is found (i.e. $\mathrm{argmin}_{k=1 \ldots K} |f_{i,j,k} - \|x_p\||$), and if the distance from this cluster is smaller than $\sigma_f^2$, the cluster is properly updated (i.e. $f_{i,j,k} \leftarrow (f_{i,j,k} h_{i,j,k} + \|x_p\|)/(h_{i,j,k} + 1)$ and $h_{i,j,k} \leftarrow h_{i,j,k} + 1$). Otherwise, the cluster with the smaller population is found (i.e. $\mathrm{argmin}_{k=1 \ldots K} h_{i,j,k}$), and is updated as follows $f_{i,j,k} \leftarrow \|x_p\|$, and $h_{i,j,k} \leftarrow 1$.

Robust data filtering can be carried out in a robust data filtering module 250. The robust data estimate (251) (performed in robust filtering module 250) is given by equation E-4:

$$d(x,s) = \mathrm{argmax} f \in \mathbb{R} \, h(f,x,s;P),$$

and can be used for robust positive-definite tensor fitting in the following energy function, which may be calculated in the tensor fitting module 260:

$$E(w_l) = \int_{S_1} \int_0^1 (f_l(x,s) - d(x,s))^2 ds \, dx.$$

The integrals in the above equation are over the unit circle $S_1$, and the [0, 1] interval of the longitudinal axis of the tensor spline. Note that s=0 and s=1 correspond to two 2D sections of the tensor spline that are perpendicular to the line segment $(a_l, b_l)$ and pass through $a_l$ and $b_l$ respectively. As with the previous energy function, the energy function in the above equation can be optimized with respect to the unknown vector $w_l$ using any gradient-based optimization method (for example as described in C. Lawson and R. Hanson, *Solving Least Squares Problems*. Prentice-Hall, 1974).

The discretized version of equation E-4 is given by $$d_{i,j} = f_{i,j,\mathrm{argmax}_{k=1:K} h_{i,j,k}}$$

and can be used for robust positive-definite tensor fitting (which may be performed in the tensor-spline fitting module 260) with the following energy function $$E(w_l) = \sum_{i=1}^{M} \sum_{j=0}^{N} (f_l(x_i, s_j) - d_{i,j})^2.$$

After having reconstructed the 3D shape of a human body using positive-definite tensor splines, it can be rendered in any arbitrary posture given in the form of a parametric skeleton S. The 3D models are colored using the R,G,B values at the corresponding projection of the points in the video frames. These values are collected in the K-mean clusters along with the data values in the dynamic histogram method.

For example, after estimating the coefficient vectors $w_l \forall l \in \mathcal{L}$, the human avatar can be rendered in any arbitrary posture given in the form of a skeleton structure S. For the purpose of rendering, each tensor-spline model is scaled by the magnitude of $\|a_l - b_l\|$ along the longitudinal axis, its center is translated to the point $(a_l + b_l)/2$, and is rotated by $R_l$.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

The results presented in this section were obtained by applying the proposed framework to real-time data acquired using the PrimeSense™ depth sensor as well as the video camera of Microsoft Kinect™ device. The device was connected (via a USB 2.0 port) to a 64-bit computer with Intel Core i5 CPU at 2.53 GHz, and 4 GB RAM. The resolution of the depth camera was 320×240 pixels with a viewing range from 0.8 m to 4.0 m and horizontal field-of-view angle (FoV) angle of 57°. The resolution of the video camera was 640×480 pixels with horizontal FoV of 62°. The proposed framework was implemented in Java using custom bindings to OpenGL and Kinect SDK libraries.

As illustrated by the data flow diagram in FIG. 2, the data histograms are updated in every frame using the incoming point-sets and then the robust data computed from the peaks of the histograms are fed to the tensor spline fitting module 260. The tensor fitting is performed by minimizing the energy function in the following equation in an on-line fashion, i.e., one iteration of the minimization algorithm is executed per frame.

$$E(w_l) = \sum_{i=1}^{M} \sum_{j=1}^{N} (f_l(x_i, s_j) - d_{i,j})^2.$$

The process illustrated in FIG. 2 has linear computational complexity with respect to the size of the input data (O(n)), and runs in real time (~25 frames/second) using the experimental setup.

In every iteration of the proposed framework cycle (illustrated in FIG. 2) the most recent pair of frames is used as input data. In the example implementation a skeletal model was used with 13 joints connected via 13 line segments ($\mathcal{L}=1 \ldots 13$). The skeletal model 300 is illustrated on the fourth plate of FIG. 3. Each line segment corresponds to a different body region with the only exception of the torso, which is made out of 4 line segments, segmenting the data into 11 point-sets $P_l$ in total (background, head, torso, 2 arms, 2 forearms, 2 thighs, and 2 legs) using the segmentation process (described with respect to the module 230).

Figure 3:
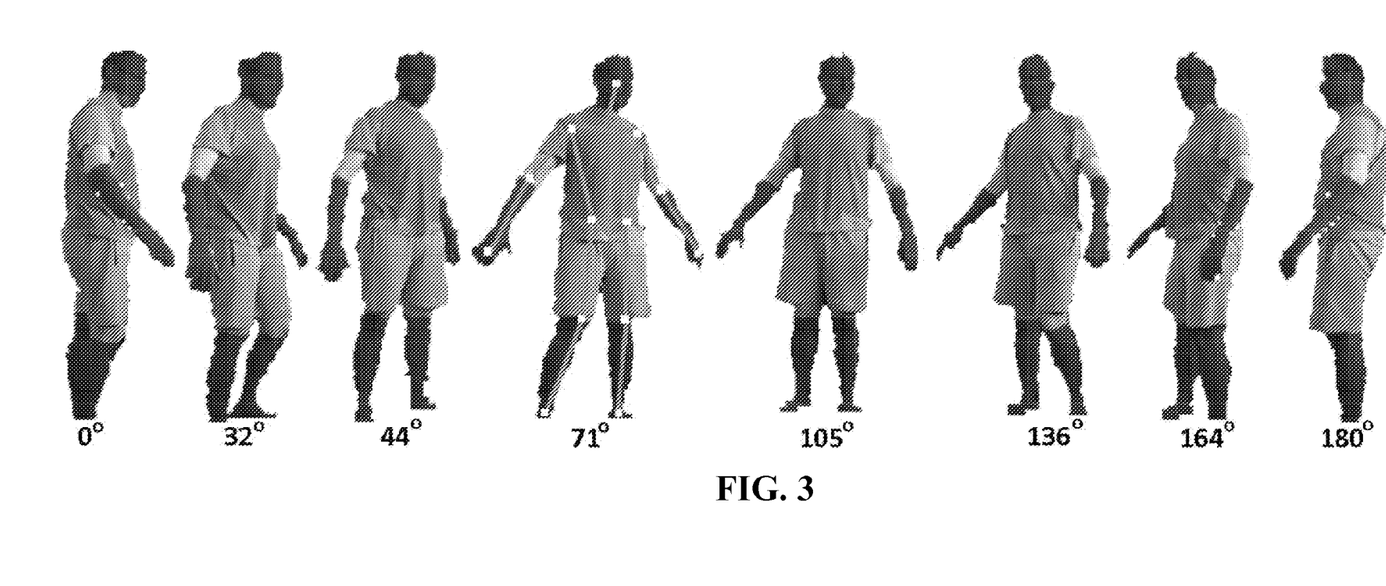
FIG. 3 shows examples of the quadratic mesh segmentation results obtained from different RGB-D frames depicting various orientations of the body. The fitted skeleton is shown on the fourth plate.

Results from the quadratic mesh segmentation are shown in FIG. 3. FIG. 3 shows the obtained quadratic mesh segments in different colors. Each of the eight plates shows the results produced in real time from various frames during a natural body motion corresponding to body orientations in [0°-180°]. The presented results show that even in extreme angles the segmentation is visually accurate.

The proposed method uses the obtained point-sets to fit 9 positive-definite tensor-spline models to the torso, arms, forearms, thighs, and legs.

Figure 4:
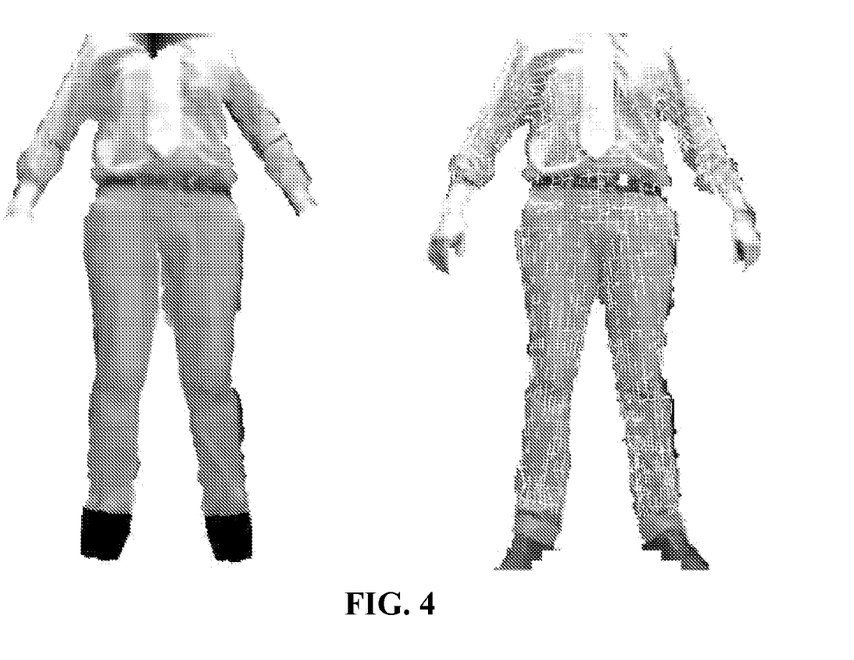
FIG. 4 shows an intermediate state of the 3D reconstructed model before convergence (left) and the rectangular grid made of the current peaks of the data histograms superimposed on the current input frame in 3D (right).

FIG. 4 shows an example of an intermediate state of the real-time process, i.e. depicting the result before the fitting algorithm converges. The right plate shows a frame of the input data with the current peaks of the data histograms ( $$d_{i,j}$$

251) superimposed as a quadratic grid. The left plate shows an intermediate state of the 3D reconstructed body model.

Figure 5:
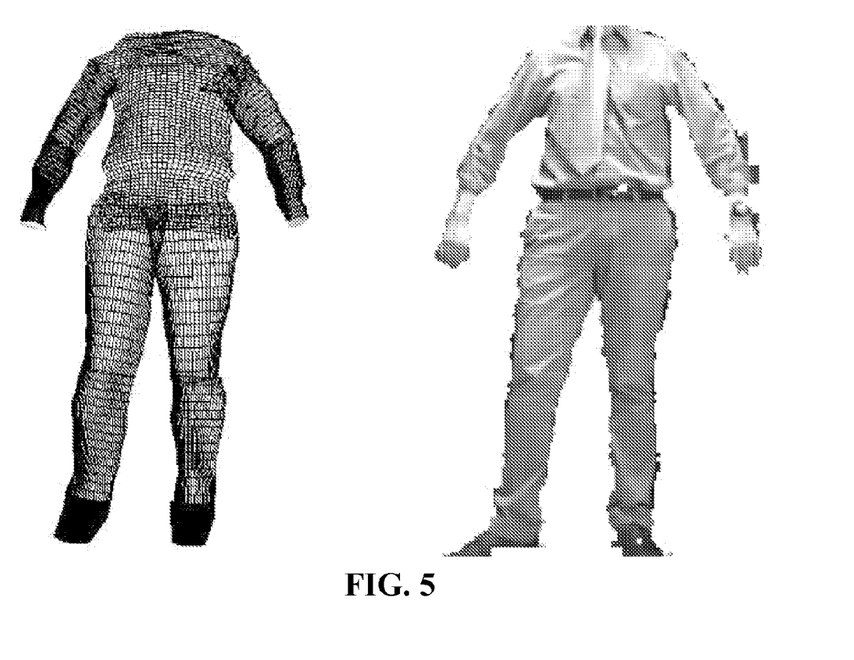
FIG. 5 shows an example of fitted tensor-splines in the form of quadratic meshes. An image of the corresponding human subject is shown on the right.
Figure 6:
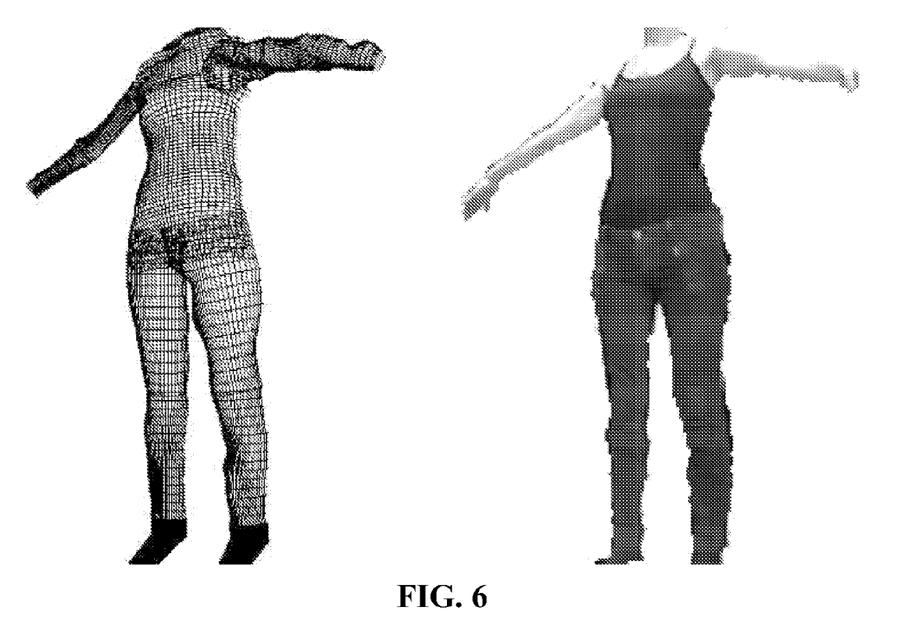
FIG. 6 shows an example of fitted-tensor splines to a female human subject.

FIGS. 5 and 6 show the computed positive-definite tensor-spline models after convergence. The tensor spline models are visualized as quadratic meshes obtained by evaluating $$f_d(\phi, s) = \sum_{j=0}^{n} \sum_{i_1, i_2} c_{i_1, i_2, j} N_{j,k+1}(s) \cos^{i_1} \phi \sin^{i_2} \phi$$

at a predefined discrete set of points in the input domain ($\phi$, s). A picture of the corresponding person is also shown on the right for visual comparison. In both cases, all tensor-splines use tensor bases of degrees d=2, 3 with cubic B-splines. That is, the number of unknown tensor coefficients are 7 per control point. This configuration produces realistic approximation of the shape of the body segments, based on visual comparison with the images of the depicted human subjects.

Figure 7:
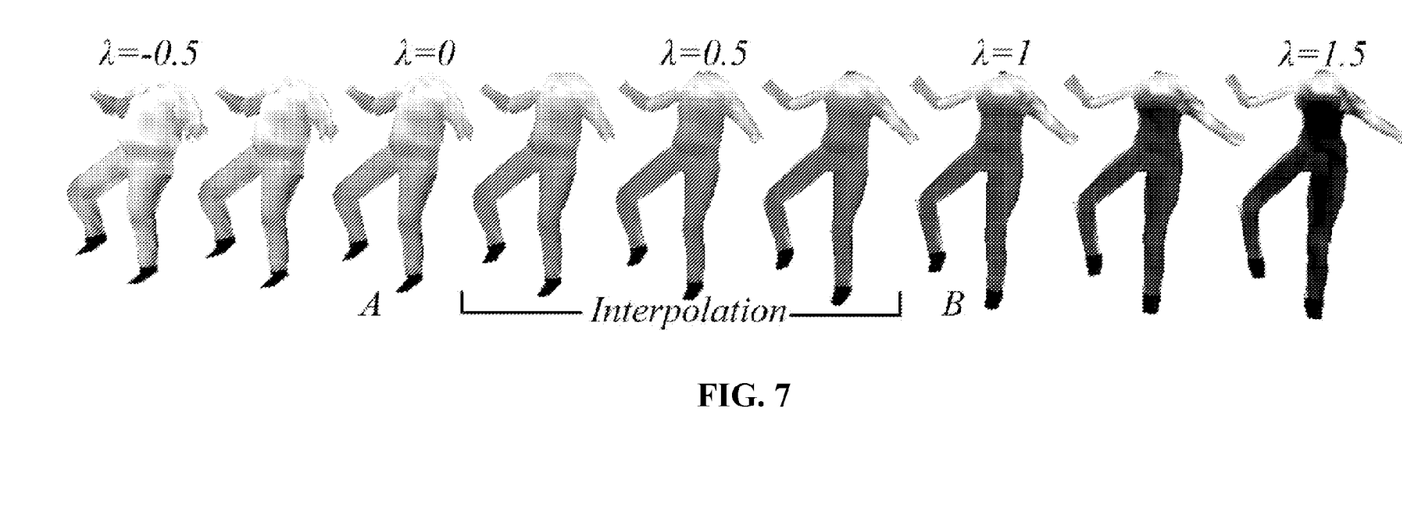
FIG. 7 shows Avatars on a geodesic defined in the Riemannian space of positive-definite tensor splines. The results of extrapolation and interpolation between the two data points show natural transitions in the appearance of the body, such as the body fat added in the extrapolant on the left ($\lambda=-0.5$).

The use of the Riemannian metric on positive-definite tensor splines is demonstrated in FIG. 7. The third avatar from the left and from the right correspond to the positive-definite tensor-spline models in FIGS. 5 and 6, respectively. The 9 avatars in FIG. 7 lie on the geodesic defined in the Riemannian space of positive-definite tensor-splines and passes through the two aforementioned avatars at $\lambda=0$ and $\lambda=1$ respectively. Other avatars on this geodesic are shown for various values of $\lambda$ in the range [−0.5, 1.5] and correspond to results of interpolation or extrapolation using the Riemannian metric. By observing the avatar on the left ($\lambda=-0.5$), one can see that the shape of the body shows natural-looking body fat in the torso and thighs. It should be emphasized that although the proposed algorithm does not model special parameters of the body such as body fat, the result of extrapolation follows a natural increment of the body fat while transitioning from the right (thinner body type) to the left (bulkier body type).

Figure 8:
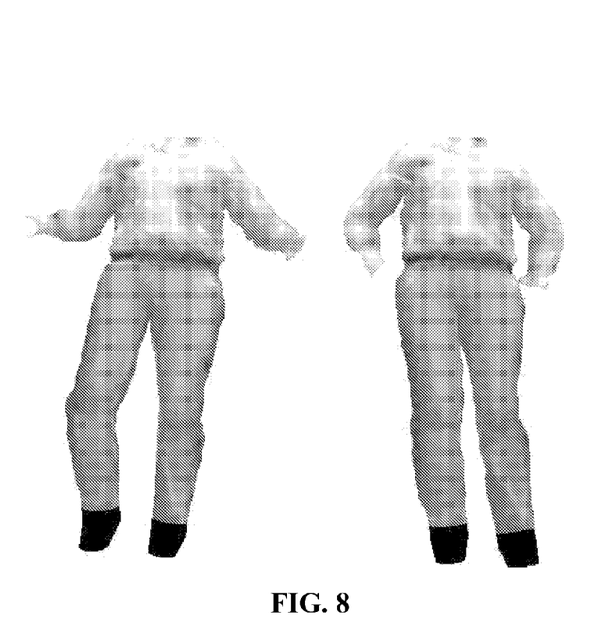
FIG. 8 shows reconstructed tensor-spline avatars rendered in different arbitrary natural postures.
Figure 9:
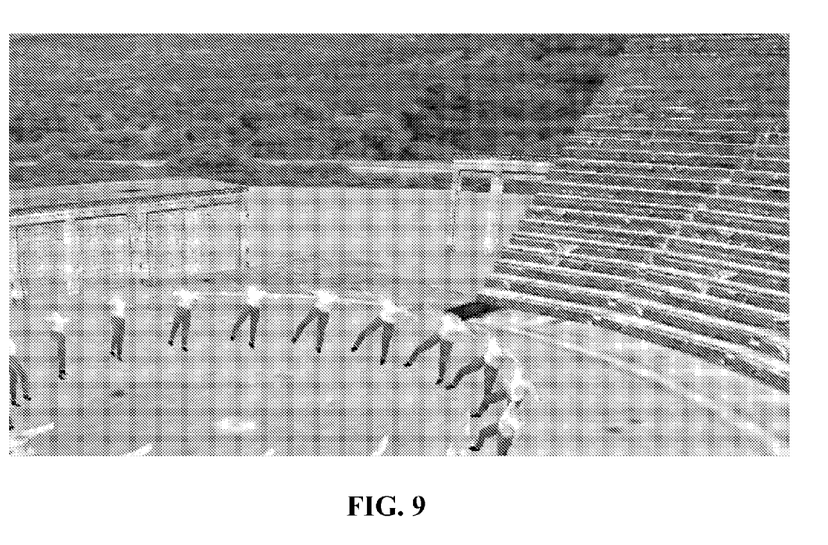
FIG. 9 shows reconstructed avatars in various postures rendered inside a life-size digitized ancient theater for experiential learning.

The avatars shown in FIGS. 7, 8, and 9 are examples of tensor-spline models rendered in various postures.

In the experiments N=64, M=64, K=21, and $\sigma_f^2=10^{-2}$. The histogram in the equation $d_{i,j} = f_{i,j,argmax_{k=1:K}h_{i,j,k}}$ does not use a point-set P as one of its arguments because the histogram $h_{i,j,k}$ is updated on-line by one data point at a time, in contrast to equation E-4. The energy equation of the tensor-spline fitting function $$\left( E(w_l) = \sum_{i=1}^{M} \sum_{j=1}^{N} (f_l(x_i, s_j) - d_{i,j})^2 \right)$$

is a polynomial with respect to the unknown vector $w_l$ and its derivatives can be easily computed analytically.

FIG. 9 shows avatars reconstructed using the described method in various postures inside a virtual environment. The avatars were positioned in a circular arrangement to demonstrate the dance part (chorus) of a classical drama inside a life-size digital replica of the ancient theater of Epidaurus. The tensor-spline avatars are rendered in real time, following the natural body motion of the user in front of the RGB-D sensor.

Example—Tensor Spline Framework

Cylindrical-type 3D shapes with positive volume can be parameterized by employing Cartesian tensor basis with positive-definite constraints.

There are several different known parameterizations of real-valued functions defined on the n-sphere (referred to here as spherical functions), $f(x): S_n \to \mathbb{R}$ where $S_n$ denotes the space of the n-dimensional sphere that lies in the n+1 Euclidean space. Two examples are the finite element basis parameterization using a triangular grid, and the spherical harmonic basis (extended to $S_n$) given by the real-valued angular portion of a set of solutions to Laplace's equation. The finite element basis has local support, which allows for local fitting of the function to data samples, while the spherical harmonic basis provides a frequency-based global support, which allows for global fitting to data samples.

The real-valued spherical harmonic bases are linearly related to the Cartesian tensor bases (or equivalently homogeneous polynomial bases), which lead to simple polynomial forms, positive-definite or semi-definite parameterizations, and other useful properties. Spherical functions can be parameterized using a tensor of degree d as follows:

$$T_d(x) = \sum_{i_1=1}^{n+1} \sum_{i_2=0}^{n+1} \cdots \sum_{i_d=1}^{n+1} c_{i_1, i_2, \ldots, i_d} x_{i_1} x_{i_2} \cdots x_{i_d} \qquad (1)$$

where $x_i$ is the $i^{th}$ component of the (n+1)-dimensional unit vector $x \in S_n$, and $c_{i_1, i_2, \ldots, i_d}$ are the tensor coefficients. The homogeneous polynomial in Eq. 1 can be equivalently expressed in the following more compact form:

$$T_d(x) = \sum_{i_1+i_2+\ldots+i_{n+1}=d} c'_{i_1, i_2, \ldots, i_{n+1}} x_1^{i_1} x_2^{i_2} \cdots x_{n+1}^{i_{n+1}} \qquad (2)$$

which has smaller number of coefficients $(n+d)!/n!d!$ compared to $(n+1)^d$ in Eq. 1, and the indices $i_1, i_2, \ldots, i_{n+1} \in \mathbb{N}_c$.

In the case of $n=1$, Eq. 2 can be written as $$T_d(\phi) = \sum_{i_1+i_2=d} c'_{i_1,i_2} \cos^{i_1}\phi \sin^{i_2}\phi \tag{3}$$

by substituting $x_1$ and $x_2$ with $\cos\phi$ and $\sin\phi$ respectively, where $\phi$ is the angular parameter of $S_1$. The number of coefficients in Eq. 3 is $d+1$.

Let $T_d^n$ denote the space of functions $f:S_n \to \mathbb{R}$ parameterized using tensors of degree d given by Eq. 2. It can be easily shown that $T_d^n \subset T_{d+2}^n \forall d \geq C$, since $\exists T_{d+2} \in T_{d+2}^n$:- $T_{d+2}(x) = xx^T T_d(x) \forall$ given $T_d(x) \in T_d^n$. Furthermore, the space $T_d^n$ corresponds to antipodal symmetric $f(x)=f(-x)$ or anti-symmetric $f(x)=-f(-x)$ functions for even or odd degrees d respectively. Based on the above properties, any spherical function can be approximated by parameterizing its symmetric and anti-symmetric component as the sum of an even and an odd degree tensor:

$$f_d(x) = T_d(x) + T_{d+1}(x). \tag{4}$$

In the case of $n=1$, the number of coefficients in Eq. 4 is $2d+3$.

In several applications there may be a need to approximate non-negative quantities, such as distance, magnitude, and weight. If such quantities are given as a function of a unit vector, this function can be approximated by fitting the model in Eq. 4 to the data using positive-definite constraints. Let $T_d^n \times T_{d+1}^n$ denote the space of the functions given by Eq. 4. The part of the space $T_d^n \times T_{d+1}^n$ that corresponds to positive-definite functions is clearly a convex subspace, more precisely a hyper-cone, since any convex combination or positive scale of the elements of that subspace is also an element of the subspace. Therefore, any positive-definite function in $T_d^n \times T_{d+1}^n$ can be approximated by a positive-weighted sum of the elements of the boundary of the hypercone. Given a dense linearly independent sampling of the boundary, the non-negative elements of $T_d^n \times T_{d+1}^n$ can be approximated by $$f_d(x) = \sum_{i=1}^{m} w_i f_{d,i}^*(x) \tag{5}$$

where $f_{d,i}^*(x)$ is a set of linearly independent elements of the boundary of the space of positive-definite functions in $T_d^n \times T_{d+1}^n$, and $w_i = 0 \forall i \in [1, m]$. The accuracy of the approximation of the hyper-cone space $T_d^n \times T_{d+1}^n$ by the hyper-polygon in Eq. 5 can be expressed as a function of m and d. The sum $\Sigma_{i=1}^m w_i$ is positive but not necessarily equal to one, since $w_i$ also captures the scale of the modeled function $f_d(x)$, which is factored out of the boundary elements $f_{d,i}^*(x)$ due to their linear independence.

According to certain implementations, the set of positive semi-definite functions are used in $T_d^1 \times T_{d+1}^1$ and are given by $$f_{d,i}^*(x) = \frac{2\pi}{m \int_0^{2\pi} \cos^d \omega \, d\omega} [y_i(x)^d + y_i(x)^{d+1}] \tag{6}$$

where $y_i(x) = x_1 \cos\theta_i + x_2 \sin\theta_i$, and $\theta_i = 2\pi i/m$. Note that Eq. 6 is non-negative for even d, and $\Sigma_{i=1}^m f_{d,i}^*(x) = 1 \; \forall x \in S_1$. Besides these useful properties, this particular function behaves as a sampling kernel since $\lim_{d \to \infty} f_{2d,i}^*(x) = \delta(x_1 - \cos\theta_i)\delta(x_2 - \sin\theta_i)$, where $\delta$ is the Dirac delta function. This natural property of sampling kernels associates the sampling frequency with the degree d of the tensor in our parameterization (i.e. the higher the degree of the tensor, the higher the frequencies that can be captured by this model).

In the case of $d=2$, the 7 coefficients of $f_{2,i}^*(x)$ are $\cos^2\theta_i/m$, $\sin^2\theta_i/m$, $2\cos\theta_i \sin\theta_i/m$, $\cos^3\theta_i/m$, $\sin^3\theta_i/m$, $3\cos^2\theta_i \sin\theta_i/m$, $3\cos\theta_i \sin^2\theta_i/m$, and correspond to the monomials $x_1^2$, $x_2^2$, $x_1 x_2$, $x_1^3$, $x_2^3$, $x_1^2 x_2$, and $x_1 x_2^2$ respectively. Similarly, the coefficients of $f_d(x)$ in Eq. 5 are given by the weighted sum of the coefficients in $f_{2,i}^*(x)$. For example the coefficient $\Sigma_{i=1}^m w_i \cos^2\theta_i/m$ corresponds to the monomial $x_1^2$.

The degrees of freedom of the model in Eq. 5 is given by the number of the tensor coefficients (2d+3 in Eq. 6) and not by the number m of unknown weights wt. This can be easily shown by rewriting Eq. 5 as $v(x)^T Fw$, where $v(x)$ is a vector with all the monomials of x in $f_{d,i}^*(x)$, is a 2D matrix with all the polynomial coefficients in $f_{d,i}^*(x)$, and w is an m-dimensional vector that consists of the values $w_i$. The size of F in Eq. 6 is $(2d+3) \times m$, and its rank (that corresponds to the degrees of freedom in Eq. 5) is at most 2d+3, assuming that $m > 2d+3$, since m was defined as the size of a dense set of linearly independent elements on the boundary of the space of positive-definite functions in $T_d^n \times T_{d+1}^n$.

A continuous and smoothly varying 1-dimensional field of positive-definite spherical functions in the form of Eq. 5 can be modeled by using the B-spline basis of degree k, denoted by $N_{j,k+1}(s)$, where j corresponds to a discretization $s_j$ (known as knots) of the domain s as follows:

$$f_d(x, s) = \sum_{i=1}^{m} \sum_{j=0}^{n} \omega_{i,j} N_{j,k+1}(s) f_{d,i}^*(x). \tag{7}$$

In the case of uniform cubic (k=3) B-splines, the bases are given by $N_{j-1,4}(s) = -(1/6)(s-s_j)^3 - 0.5(s-s_j)^2 + 0.5(s-s_j) + 1/6$, $N_{j,4}(s) = 0.5(s-s_j)^3 - (s-s_j)^2 + 2/3$, and $N_{j+1,4}(s) = -0.5(s-s_j)^3 + 0.5(s-s_j)^2 + 0.5(s-s_j) + 1/6$ for $s \in [s_j, s_j+1]$, and zero everywhere else. In Eq. 7 the weights wi,j are the so-called control points, which are blended across j using the B-spline basis. Furthermore, the tensors given by $\Sigma_{i=1}^m w_{i,j} f_{d,i}^*(x) \forall j \in [0,n]$ play the role of control tensors along a 1-dimensional field.

The mathematical model in Eq. 7 can be used for parameterizing cylindrical type of objects with one radial and one longitudinal dimension. The 3D coordinates of the points on the parameterized surface are given by $[x_1 f_d(x, s), x_2 f_d(x, s), s]$, where the third dimension corresponds to the longitudinal axis s, and $x = [\cos\phi, \sin\phi]$. A typical symmetric cylinder of radius $\rho$ and height h can be parameterized using a uniform tensor spline by setting $w_{i,j} = \rho \forall i, j$ and $s_{j+1} - s_j = h/(n+1-k) \forall j$ in Eq. 7.

By substituting Eqs. 3 and 6 into Eq. 7 the following positive-definite tensor spline model can be derived for $S_1$:

$$f_d(\phi, s) = \sum_{j=0}^{n} \sum_{i_1, i_2} c_{i_1, i_2, j} N_{j,k+1}(s) \cos^{i_1}\phi \sin^{i_2}\phi \tag{8}$$

where the second sum is over all pairs of indices $(i_1, i_2)$: $i_1+i_2 \in \{d, d+1\}$, $i_1, i_2 \in \mathbb{N}_c$. In the case of $d=2$, there are 7 tensor coefficients $c_{i_1,i_2,j}$, which are listed in table 1.

TABLE 1

List of tensor coefficients in Eq. 8 for d = 2

| $i_1 + i_2$ | $c_{i_1,i_2,j}$ |
|---|---|
| 2 | $c_{2,0,j} = \Sigma_{i=1}^m w_{i,j} \cos^2(2\pi i/m)/m$ |
| 2 | $c_{0,2,j} = \Sigma_{i=1}^m w_{i,j} \sin^2(2\pi i/m)/m$ |
| 2 | $c_{1,1,j} = \Sigma_{i=1}^m w_{i,j} 2\cos(2\pi i/m)\sin(2\pi i/m)/m$ |
| 3 | $c_{3,0,j} = \Sigma_{i=1}^m w_{i,j} \cos^3(2\pi i/m)/m$ |
| 3 | $c_{0,3,j} = \Sigma_{i=1}^m w_{i,j} \sin^3(2\pi i/m)/m$ |
| 3 | $c_{2,1,j} = \Sigma_{i=1}^m w_{i,j} 3\cos^2(2\pi i/m)\sin(2\pi i/m)/m$ |
| 3 | $c_{1,2,j} = \Sigma_{i=1}^m w_{i,j} 3\cos(2\pi i/m)\sin^2(2\pi i/m)/m$ |

Eq. 8 is positive-definite $f_d(\phi, s) > 0 \forall \phi \in [0, 2\pi]$, and $t \in [s_0, s_{n+1-k}]$. Note that there are no additional constraints imposed to the range of the values of the tensor coefficients $c_{i_1,i_2,j}$, besides the fact that $w_{i,j} > 0$. The degrees of freedom of the models in Eqs. 7 and 8 are given by the number of tensor coefficients $c_{i_1,i_2,j}$. In the particular case of Eq. 8 the number of coefficients is $(2d+3) \times (n+1)$, i.e., it depends linearly on the degree of the tensor as well as the number of control points of the B-spline.

For the tensor-spline distance measure, let $a_d(x, s)$ and $b_d(x, s)$ be two positive-definite tensor splines (defined as in Eq. 8), with coefficients $a_{i_1,i_2,j}$ and $b_{i_1,i_2,j}$ respectively. There are several possible metrics that can be used to define the distance between $a_d$ and $b_d$, such as the Euclidean distance $$dist(a_d, b_d) = \sqrt{\sum_{j=0}^n \sum_{i_1,i_2} (a_{i_1,i_2,j} - b_{i_1,i_2,j})^2},$$

or the $L_2$ norm given by $dist(a_d, b_d) = \sqrt{\Sigma_{j=0}^n \int_{S_1} (a_d(x,s) - b_d(x,s))^2 dx}$. In the latter case, the integrals can be analytically computed as powers of trigonometric functions by parameterizing the vectors in $S_1$ as $x = [\cos \phi, \sin \phi]$. Such metrics are useful for computing not only the distances between tensor splines, but also the average from a given set of tensor splines, as well as for interpolation and extrapolation and for defining energy functions in optimization methods.

In the case of the two aforementioned metrics, the tensor splines $a_d(x, s)$ and $b_d(x, s)$ can be treated as elements of a Euclidean space, and be represented in this space by vectors a, b $\in \mathbb{R}^{(2d+3) \times (n+1)}$ that consist of the coefficients $a_{i_1,i_2,j}$ and $b_{i_1,i_2,j}$ respectively. However, tensor splines that are not necessarily positive-definite can also be mapped to the same Euclidean space, hence there is no guarantee that the result of extrapolation given by a+$\lambda$(b−a): $\lambda \in (-\infty, 0) \cup (1, \infty)$ will correspond to a positive-definite tensor spline. This may produce shapes of negative volume that are unnatural in many applications, including modeling the 3D shape of human body parts. To overcome this problem, a positive-definite parameterization can be employed.

To illustrate the Riemannian metric, let the coefficients $a_{i_1,i_2,j}$ and $b_{i_1,i_2,j}$ be parameterized as in table 1 using the positive weights $w_{i,j}^a$ and $w_{i,j}^b$ respectively (the table lists the formulas for the $2^{nd}$ and $3^{rd}$ degree coefficients only but it can be easily extended to higher degrees by expanding the terms in Eq. 6). The corresponding tensor splines can be treated as elements of the $\mathbb{R}_{++}^{m \times (n+1)}$, and be represented in this space by stacking the weights $w_{i,j}^a$ and $w_{i,j}^b$ in the form of vectors $w_a, w_b \in \mathbb{R}_{++}^{m \times (n+1)}$, where $\mathbb{R}_+$ denotes the space of positive real numbers.

The distance measure in this space can be defined using the Riemannian metric on $\mathbb{R}_*^+$ that utilizes its tangent space (defined by the log mapping): $dist(a_d, b_d) = \|Log(w_a) - Log(w_b)\|$, where the function $Log()$ is the natural logarithm applied individually to every element of the input vector. The same Riemannian metric can be used for interpolation/extrapolation using the exp projection from the tangent space to $\mathbb{R}_+$ as follows: $Exp(Log(w_a) + \lambda(Log(w_b) - Log(w_a)))$, where the function $Exp()$ is the natural exponential applied individually to every element of the input vector. The computed vectors are guaranteed to correspond to positive-definite tensor splines $\forall \lambda \in \mathbb{R}$. The Riemannian metric assigns infinite distance between positive-definite tensor splines and semi-definite tensor splines, hence the boundary of the space of positive-definite tensor splines can be approached by extrapolating towards the boundary using $\lim_{\lambda \to \infty}$. Examples of interpolation and extrapolation of positive-definite tensor splines using the Riemannian metric are shown in FIG. 7.

Example—Computing System

Figure 10:
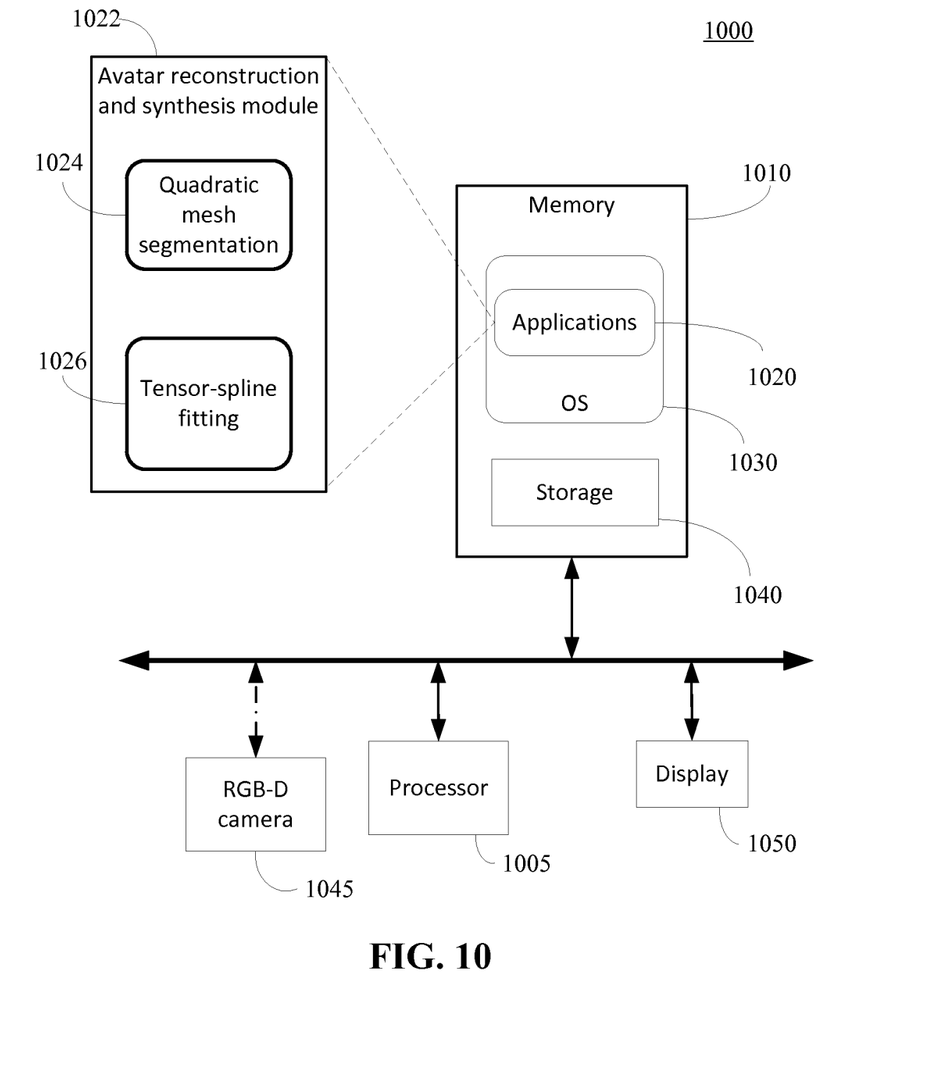
FIG. 10 shows a block diagram illustrating a computing system for reconstruction of the human body and automated avatar synthesis in which implementations of the invention may be carried out.

FIG. 10 shows a block diagram illustrating a computing system for reconstruction of the human body and automated avatar synthesis in which implementations of the invention may be carried out. According to an embodiment, the system 1000 can include a processor 1005 and storage system 1010 in which one or more applications 1020 may be loaded.

Processor 1005 may include a microprocessor and other circuitry that retrieves and executes software (including applications 1020 and/or an operating system 1030) from the storage system 1010. Processor 1005 may be implemented within a single processing device but may also be distributed across multiple processing devices or sub-systems that cooperate in executing program instructions. Examples of processor 1005 include general purpose central processing units, application specific processors, and logic devices, as well as any other type of processing device, combinations, or variations thereof.

The storage system 1010 can store software as well as data generated during the execution of the software. The storage system 1010 may comprise any computer readable storage media readable by processor 1005 and capable of storing software.

Carrier waves and other propagating signals that may contain data usable by a computer system are not themselves "storage media." That is, "computer-readable storage media" and "storage media" do not consist of carrier waves or propagating signals.

Storage system 1010 may include volatile and nonvolatile, removable and non-removable media implemented in any method or technology for storage of information, such as computer readable instructions, data structures, program modules, or other data. For example, non-volatile storage 1040 may be available within the storage system 1010 to store persistent information that should not be lost if the system is powered down.

Examples of storage media include random access memory (including RAM, DRAM, DDR SDRAM, SRAM); read only memory (ROM, PROM, EPROM, EEPROM); flash memory (NVRAM); magnetic and ferromagnetic/ferroelectric memories (MRAM, FeRAM); resistive memories and memristors (resistive random-access memory (Re- RAM), PCM, CBRAM); magnetic disks; optical disks; virtual memory and non-virtual memory, magnetic cassettes, magnetic tape, magnetic disk storage or other magnetic storage devices, or any other suitable storage media. In no case is the storage media a propagated signal.

In addition to storage media, in some implementations, storage system 1010 may also include communication media over which software may be communicated internally or externally. Storage system 1010 may be implemented as a single storage device but may also be implemented across multiple storage devices or sub-systems co-located or distributed relative to each other. Storage system 1010 may include additional elements, such as a controller, capable of communicating with processor 1005.

The software (including applications 1020 and/or an operating system 1030) may include additional processes, programs, or components. Software may also comprise firmware or some other form of machine-readable processing instructions executable by processor 1005.

In general, software may, when loaded into processor 1005 and executed, transform computing system 1000 overall from a general-purpose computing system into a special-purpose computing system. Indeed, encoding software on storage system 1010 may transform the physical structure of storage system 1010. The specific transformation of the physical structure may depend on various factors in different implementations of this description. Examples of such factors may include, but are not limited to the technology used to implement the storage media of storage system 1010 and whether the computer-storage media are characterized as primary or secondary storage.

For example, if the computer-storage media are implemented as semiconductor-based memory, software may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

The processor 1005 processes data according to instructions of the applications 1020. The applications can include an avatar reconstruction and synthesis module 1022 performing techniques and calculations described herein. The avatar reconstruction and synthesis module 1022 can include a quadratic mesh segmentation module 1024 and a tensor-spline fitting module 1026. In some cases, one or more of the following modules may be included as well: a skeleton fitting module (220), an RGB-D mapping module (210), a robust data filtering module (250) and a histogram accumulator module (240).

The applications 1020 can be run on or associated with the operating system 1030 that can also be loaded into the storage system 1010. Other applications may be loaded into the storage system 1010 and run on the computing device, including various client and server applications. An RGB-D camera 1045 or other range camera can be coupled to the system via wired or wireless connections. In some implementations, the RGB-D camera 1045 is connected to a separate system to capture the data (and in some cases initially process the data). The captured and optionally processed data may be sent to the system 1000 via wired or wireless methods.

Visual output can be rendered and provided via a display 1050. The display 1050 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 1050 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

In some embodiments, a natural user interface is facilitated through the inclusion of one or more non-touch sensors (including temperature, video, and electromagnetic sensors) associated with the system.

Input/Output (I/O) devices (not shown) such as a keyboard, mouse, network card or other I/O device may also be included. It should be understood the any computing device implementing the described system may have additional features or functionality and is not limited to the configurations described herein. In addition, it should be understood that system 1000 may be implemented as a single apparatus, system, or device or may be implemented in a distributed manner as multiple apparatuses, systems, or devices.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A computer-implemented method comprising:
receiving discrete depth frames $D_{i,j}$ from a depth camera;
calculating quadratic meshes given by $X_{i,j}=(i-i_c)D_{i,j}c_d^{-1}$, $Y_{i,j}=(j-j_c)D_{i,j}c_d^{-1}$, and $Z_{i,j}=D_{i,j}$, where $i_c, j_c$ denote coordinates of a central pixel in a depth frame, and $c_d$ is a focal length of the depth camera;
detecting a presence of a particular skeletal geometry from a sequence of data frames by fitting each frame of the discrete depth frames to a skeletal model with parameters defined from $$S=\{a_l \in \mathbb{R}^3, b_l \in \mathbb{R}^3, R_l \in SO(3) : l \in \mathcal{L}\}$$

where $\mathcal{L}$ is a set of indices of line segments defined by end-points $a_l$ and $b_l$, and its orientation in the 3D space is given by the rotation matrix $R_l$;
segmenting the quadratic mesh into body regions by using the parameters of the skeletal model S; and
fitting a positive-definite tensor spline of a spline model $$f_d(x,s) = \sum_{i=1}^{m}\sum_{j=0}^{n} w_{i,j} N_{j,k+1}(s) f^*_{d,i}(x)$$

to a point-set $P_l$ of points that belong to a particular body region of the body regions.

2. The computer-implemented method of claim 1, further comprising:
filtering the point-set before fitting the positive-definite tensor spline to the point-set, wherein filtering the point-set comprises:
calculating $$h(f, x, s; \mathcal{P}) = \sum_{p \in \mathcal{P}} N(f; \|x_p\|, \sigma_f^2) N(s; s_{l(p)}(p), \sigma_s^2) V\left(x; \frac{x_p}{\|x_p\|}, \kappa\right)$$

where $f \in \mathbb{R}$, $x \in S_1$, $s \in \mathbb{R}$, functions $N(\ )$ and $V(\ )$ denote a Normal and a von Mises probability density functions respectively, parameters $\sigma_f^2$, $\sigma_s^2$ and $\kappa$ are variances and concentration of the probability density functions; and computing a data estimate $$d_{i,j} = f_{i,j, \mathrm{argmax}_{k=1:K} h_{i,j,k}}.$$

3. The computer-implemented method of claim 2, wherein fitting the positive-definite tensor spline to the point-set comprises: reconstructing a 3D shape of a human body by computing an energy function $$E(w_l) = \sum_{i=1}^{M} \sum_{j=1}^{N} (f_l(x_i, s_j) - d_{i,j})^2.$$

4. The computer-implemented method of claim 1, wherein segmenting the quadratic mesh into body regions by using the parameters of the skeletal model S comprises:
calculating, for every vertex $p=[X_{i,j}\ Y_{i,j}\ D_{i,j}]^{-T}$ in the quadratic mesh, the index l of the closest line segment in the skeletal model as $l(p) = \mathrm{argmin}_{l \in \mathcal{L}} \|a_l + s_l(p)(b_l - a_l) - p\|$ where $a_l, b_l \in \mathbb{R}^3$ are vertices/joints that define a particular line segment in the skeletal model, and $s_l(p)$ is the projection of p onto the $l^{th}$ line segment given by:

$$s_l(p) = \max\left\{\min\left\{\frac{(b_l - a_l)^T(p - a)}{\|b_l - a_l\|^2}, 1\right\}, 0\right\}.$$

5. The computer-implemented method of claim 1, further comprising:
after estimating the coefficient vectors $w_l\ \forall l \in \mathcal{L}$, rendering a human avatar in any arbitrary posture given in the form of S.

6. The computer-implemented method of claim 5, wherein the rendering of the human avatar comprises:
scaling each tensor-spline model by a magnitude of $\|a_l - b_l\|$ along a longitudinal axis, translating its center to a point $(a_l + b_l)/2$, and rotating by $R_l$.

7. The computer-implemented method of claim 1, further comprising:
receiving red-green-blue (RGB) video frames from a video camera;
associating the RGB video frames with the quadratic meshes to generate a colored quadratic mesh by using a UV texture mapping given by coordinates $U_{i,j} = X_{i,j}' Z_{i,j}'^{-1} c_v$, $V_{i,j} = Y_{i,j}' Z_{i,j}'^{-1} c_v$, where the coordinates of the vector $[X'\ Y'\ Z']^T$ are related to $[X\ Y\ Z]^T$ via a rigid transformation with rotation and translation, and $c_v$ is a focal length of the video camera;
fitting the RGB video frames to the skeletal model with parameters defined from $S=\{a_l \in \mathbb{R}^3, b_l \in \mathbb{R}^3, R_l \in SO(3): l \in \mathcal{L}\}$; and
segmenting the colored quadratic mesh into the body regions by using the parameters of the skeletal model S.

* * * * *